Figure 1:
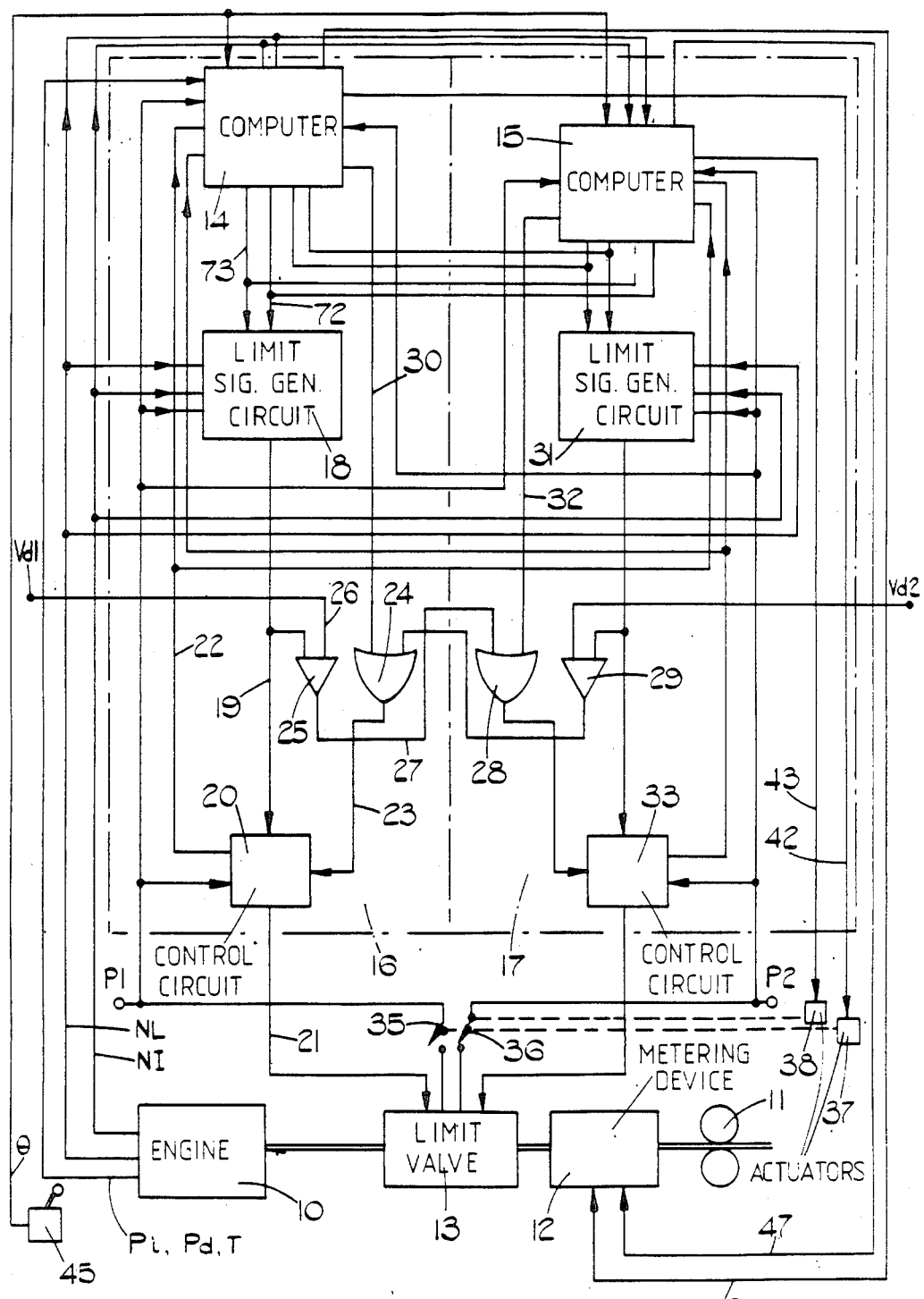

United States Patent [19]

Morris et al.

[11] Patent Number: 4,679,151
[45] Date of Patent: Jul. 7, 1987

[54] CONTROL FOR A LIMITING DEVICE

[75] Inventors: Clive A. Morris; Michael J. Joby, both of Solihull, England

[73] Assignee: Lucas Industries public limited company, Birmingham, England

[21] Appl. No.: 513,816

[22] Filed: Jul. 14, 1983

[30] Foreign Application Priority Data

Jul. 20, 1982 [GB] United Kingdom ............... 8220913

[51] Int. Cl.⁴ .................. G06G 7/57; G05B 9/02; G06F 7/34; G01F 11/04
[52] U.S. Cl. .................. 364/510; 364/570; 364/187; 371/68; 73/199
[58] Field of Search ............... 364/570, 571, 510, 558, 364/187; 371/68; 73/199, 4 R

[56] References Cited

U.S. PATENT DOCUMENTS

| | | | |
|---|---|---|---|
| 3,636,331 | 1/1972 | Amrehn | 364/187 |
| 3,707,675 | 12/1972 | Krechmery et al. | 364/510 |
| 4,012,717 | 3/1977 | Censier et al. | 371/68 |
| 4,130,241 | 12/1978 | Meredith et al. | 371/68 |
| 4,153,198 | 5/1979 | Eki et al. | 371/68 |
| 4,270,168 | 5/1981 | Murphy et al. | 371/68 X |
| 4,277,832 | 8/1981 | Wong | 364/510 |

OTHER PUBLICATIONS

Millman, Jacob, "Micro-Electronics", 1979, pp. 338-342.

Primary Examiner—Errol A. Krass
Assistant Examiner—Joseph L. Dixon
Attorney, Agent, or Firm—Holman & Stern

[57] ABSTRACT

A system for generating electrical signals which are intended to control a flow limiting device, in particular in a fuel control apparatus, has duplicate signal generating circuits which are responsive to operation of the fuel control apparatus and which generate nominally indentical output signals when an operating condition of the fuel control apparatus exceeds predetermined limits. Output signals from the duplicate circuits are supplied to the limiting device by way of respective control circuits each of which is enabled by the presence of a corresponding output signal from the other of the signal generating circuits. A device is provided for detecting a malfunction of one of the signal generating circuits and for permanently enabling the control circuit.

15 Claims, 4 Drawing Figures

CONTROL FOR A LIMITING DEVICE

This invention relates to a system for generating electrical signals which can impose operating limits on an apparatus, and in particular to such a system for use with a device for limiting fuel flow to an engine.

It is known to provide, in a gas turbine engine fuel control system, a fuel flow limiting valve which is arranged in series with a variable metering device. A gas turbine engine including such a flow limiting valve is disclosed in U.K. Patent application No. 2088962A, in which the flow limiting valve is servo pressure operated and in which a pilot valve for regulating the servo pressure is actuated by a torque motor driven by signals from a circuit which is responsive to selected operating conditions of the engine. If these conditions reach predetermined upper levels the limiting valve is actuated to reduce fuel flow until the required operating conditions are restored. Typically, values of shaft speed and temperature are monitored for the purpose of flow limitation.

It is a disadvantage of such known systems that malfunction of the circuit which generates the torque motor control signals may result in fuel flow to the engine remaining limited to a level at which efficient operation may not be possible. It is an object of the present invention to provide a control system in which this disadvantage is substantially overcome.

According to the invention there is provided a system for generating electrical signals for operating a limit device on an apparatus, said system comprising first and second circuits responsive to an operating condition of said apparatus for generating nominally identical respective first and second output signals when said operating condition reaches a predetermined value, first and second control devices for providing first and second actuating signals to said limit device, in response to said first and second output signals respectively, and means for enabling said first and second control devices in response to said second and first output signals respectively.

Figure 2:
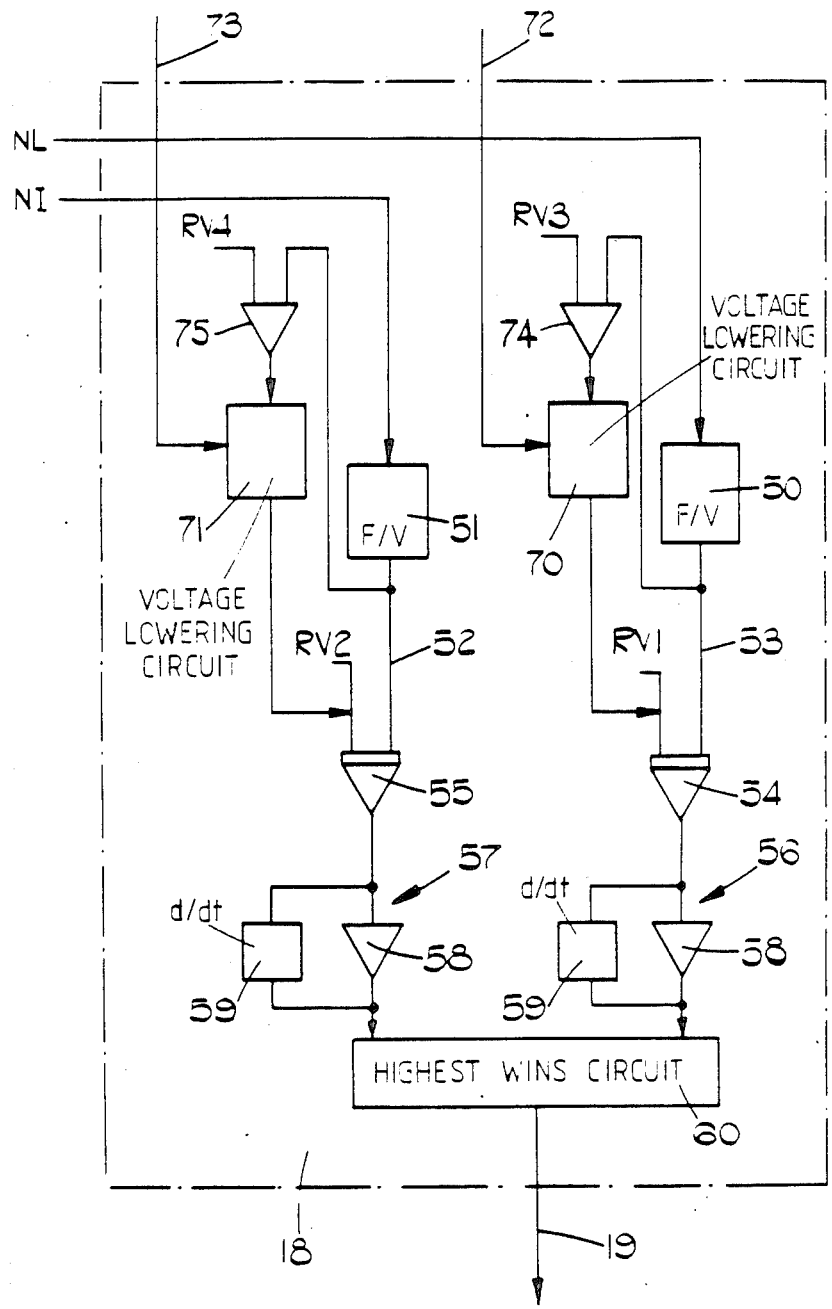
Figure 3:
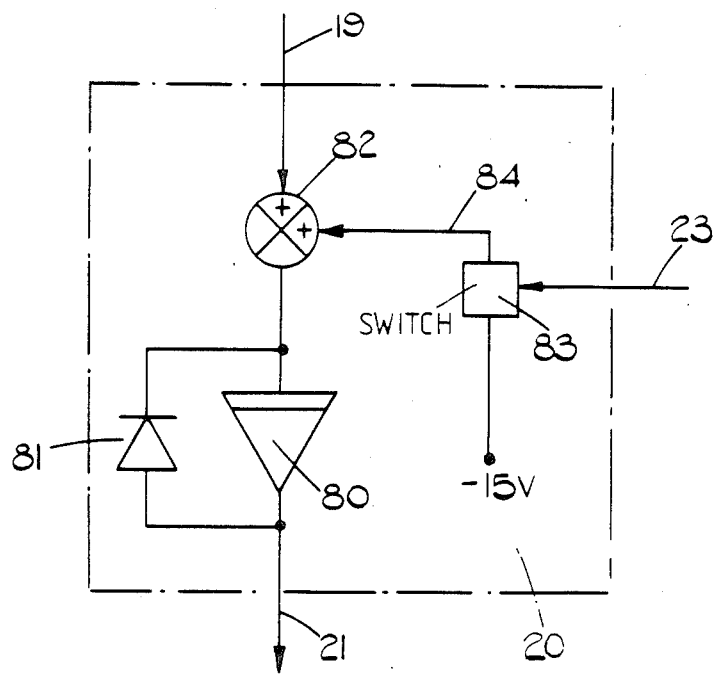
Figure 4:
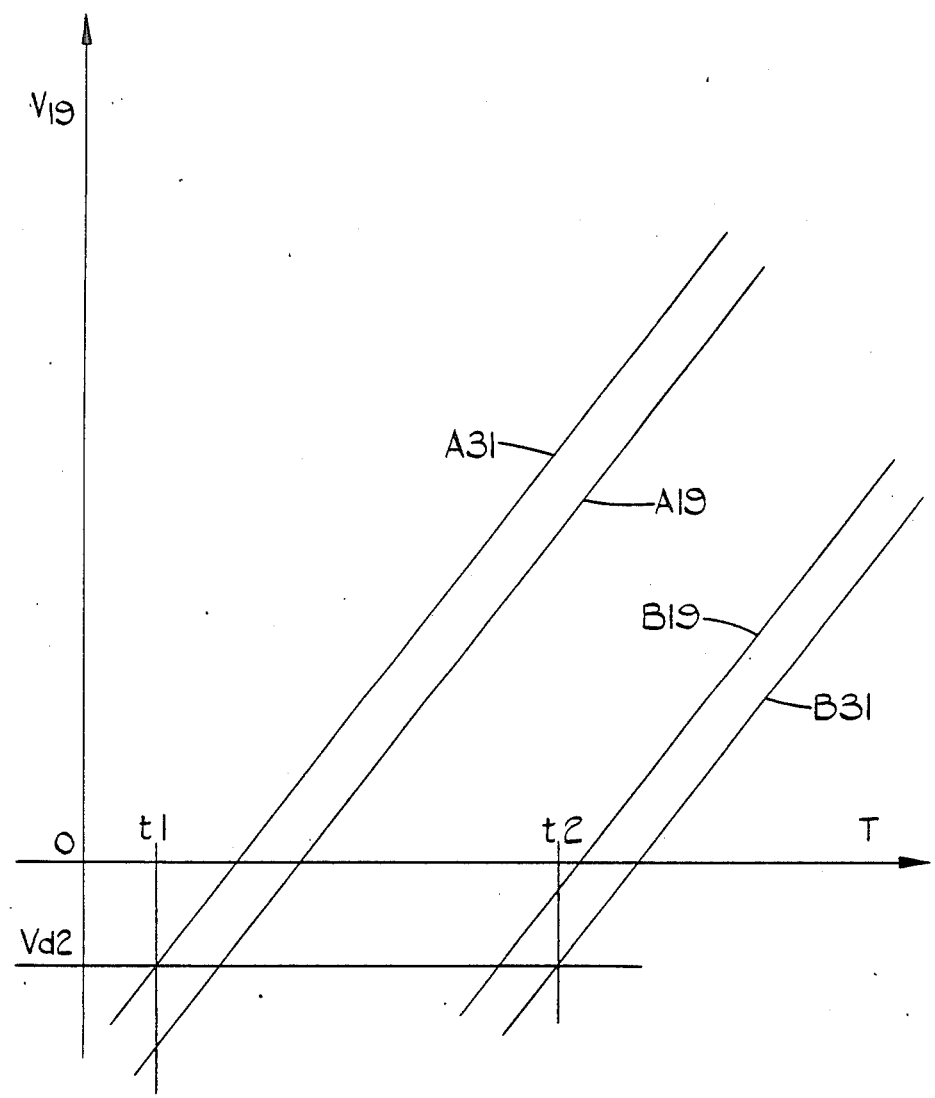

An embodiment of the invention will now be described by way of example only and with reference to the accompanying drawings in which:

FIG. 1 is a block diagram of a limit signal generating arrangement in conjunction with a fuel control system for a gas turbine engine, FIG. 2 is a block diagram of a limit signal generating circuit forming part of the system of FIG. 1, FIG. 3 is a diagram of a control circuit forming part of the arrangement of FIG. 1, and FIG. 4 shows time relationships of voltages in the circuit of FIG. 3.

As shown in FIG. 1 a gas turbine engine 10 is supplied with fuel by a pump 11 through a variable metering device 12 and a flow limiting device 13 which are arranged in series. Such a fuel control system is disclosed in more detail in U.K. Patent Application No. 2088962A. The variable metering device 12 is responsive to nominally identical signals which originate in two digital computer arrangements 14, 15 which form part of respective identical electrical control arrangements 16, 17, each of which includes a circuit for generating control signals for the flow limiting device 13, in response to operating conditions of the engine 10, for example the speeds of the high, intermediate and low pressure turbines. Only the arrangement 16 will be described in detail, since the arrangement 17 corresponds.

Mounted in the engine 10 are two transducers which provide frequency signals NL, NI which respectively correspond to the speeds of the low pressure and intermediate pressure shafts of the engine 10. A first limit signal generating circuit 18, shown in more detail in FIG. 2, is responsive to the signals NL, NI and compares each of these with respective reference values. The circuit 18 provides an ouput voltage on a line 19, the magnitude of this voltage corresponding to the larger of the amounts by which either of the signals NL, NI exceeds its reference value. The signal on line 19 is such as to require the larger flow limitation to be applied via the valve 13.

A control circuit 20, shown in more detail in FIG. 3, is responsive to the signal on line 19 and provides an output signal on a line 21 which is indicative of the magnitude of a required energising current to be applied to one winding of a double winding torque motor in the device 13. The circuit 20 also supplies, on a line 22 to the computers 14, 15, a signal indicative of the magnitude of the signal on line 21. The device 20 applies current to line 21 only in the presence of an enable signal on a line 23 from an OR gate 24. A comparator 25 is responsive to the signal on line 19 and to an adjustable datum voltage Vd1 on a line 26, so that the comparator 25 provides an output signal on a line 27 when the signal on line 19 exceeds the datum voltage Vd1.

The signal on line 27 is applied to one input of an OR gate 28 in the arrangement 17, corresponding to the gate 24. One input of the gate 24 is provided by an output signal from a comparator 29 in the arrangement 17, corresponding to the comparator 25. The other input of the OR gate 24 is provided on a line 30 from the computer arrangement 14, indicating that a limit signal generating circuit 31 in the arrangement 17, corresponding to the circuit 18, has malfunctioned. In the absence of an indicating signal on line 30, the OR gate 24 provides an output only when an output signal from the circuit 31 exceeds the level to which its datum voltage Vd2 has been adjusted. In the absence of the signal on line 30 the circuit 20 will be enabled to cause the device 13 to respond to the limit signal on line 19, only when a corresponding signal from the circuit 31, in excess of the datum value Vd2, is present.

A corresponding enabling system exists in the arrangement 17, so that in the absence of override signals from the computer arrangements 14, 15, a flow limiting signal from either one of the circuits 18, 31 will not affect the device 13 unless a substantially corresponding signal has been provided by the other of the circuits 18, 31.

The circuits 18, 20 and one winding of the torque motor in the limit device 13 are energisable from a first power supply P1. Corresponding elements in the arrangement 17, as well as the other winding of the torque motor, are energisable from a second power supply P2. The supplies P1, P2 may selectively be applied to the device 13 through changeover switches 35, 36 operable by respective electro-magnetic actuators 37, 38. Operation of the switches 35, 36 can change control of the device 13 from the arrangement 16 to the arrangement 17, or vice versa. The switches 35, 36 may also be operated by the actuators 37, 38 to a position in which the device 13 is isolated from both of the supplies P1, P2. Additionally, the switches 35, 36 may be manually operated by suitable means (not shown).

Each of the computer arrangements 14, 15 comprises two identical digital computers whose output signals are compared on a bit-by-bit basis, and includes means for providing a fault signal if non-correspondence between the two computer outputs persists. Such an arrangement is disclosed in U.S. Pat. No. 4,251,873. Each of the computers in the arrangements 14, 15 is provided with self-monitoring facilities of a known type. For example the computers intermittently carry out a check programme which uses all of the instructions in the control programme, and compares a known result of this check programme with a stored word in the computer memory. A check of the hardware of each of the computers is effected by so-called "watchdog" timers which contain a hard-wired value and which are responsive to the computer outputs at repeated short intervals, during which intervals the computers must supply a corresponding value for comparison with the hard-wired value. A repeated failure on the part of the computers to supply the required values will result in a fault indicating signal being generated. Alternatively, or additionally, testing of the contents of a fixed memory may be effected by periodic checking of the sum of the contents of all the memory locations. Fault indicating signals from the computer arrangements 14, 15 are supplied on respective lines 42, 43 to the actuators 37, 38 respectively, so that a fault indicating signal from the arrangement 14 causes the switches 35, 36 to operate so as to place the limiter device 13 under control of the arrangment 17.

Each of the computer arrangments 14, 15 is responsive to the values NL, NH, as well as to other operating conditions of the engine 10, for example compressor intake and delivery pressures Pi, Pd, engine temperature T and a signal $\theta$ from an engine power demand device 45. The computer arrangements 14, 15 respond to these input signals to provide nominally identical control signals on lines 46, 47 to the metering device 12. The functions of the computer arrangements 14, 15 in controlling the metering device 12 do not, however, form part of the present invention and are not described in detail herein. Additionally, each of the computer arrangements 14, 15 is responsive to the levels of both of the power supplies P1 and P2.

As shown in FIG. 2, in the device 18 the speed signals NL, NI are applied to respective frequency to voltage converters 50, 51 whose output voltages are applied on respective lines 52, 53 to one input of integrating error amplifiers 54, 55 respectively. Reference voltages RV1, RV2, each corresponding to respective maximum acceptable values of engine speeds NL, NI are applied to other inputs of the respective amplifiers 54, 55. For test purposes these reference voltages may be modified in a manner later to be described.

The output signals from the error amplifiers 54, 55 correspond to magnitudes of the actuating signal on line 21, and are supplied to respective circuits 56, 57, each of which comprises a proportional amplifier 58 and a differentiating circuit 59, arranged in parallel. As indicated above it is required that the output signal on line 19 should be such as to require the lesser fuel flow, and hence that the greater of the speed error signals should be provided on line 19. Accordingly therefore the outputs from the circuits 56, 57 are applied to a highest wins circuit 60, from which the higher of the two outputs is supplied on line 19.

It may be necessary to test the system with the engine 10 running at a relatively low speed. For this purpose the reference voltages RV1, RV2 are set to lower values by means of respective circuits 70, 71. Circuits 70, 71 are activated by signals on respective lines 72, 73 from the computer arrangement 14, in response to a requirement to carry out the aforesaid low speed test. It is arranged, however, that operation of the circuits 70, 71 is inhibited by signals from respective comparators 74, 75. The comparators 74, 75 are responsive to the speed dependent signals on lines 52, 53 and to reference voltages RV3 and RV4 which correspond to minimum operating levels of engine speed, whereby the circuits 70, 71 will not operate if the engine speed at or above an operating level which is intermediate the low test speed and a speed at which the flow limiting device is required to operate. The arrangement is such that lower reference values cannot be applied to the amplifiers 54, 55 when the engine is running normally. These lower reference levels may therefore be applied only for the purpose of low speed ground test. During a ground test, and with the reference voltages to the amplifiers 54, 55 set to reduced values, the engine speed is increased to provide signals on line 52, 53 above the aforesaid reduced reference values, and the computers 14, 15 check that the signals on line 19 show the required rise, as indicated by the signal level on line 22 (FIG. 1).

As shown in FIG. 3 the circuit 20 comprises an integrating amplifier 80 provided with a diode 81, the arrangement acting so that the amplifier 80 does not provide negative-going signals on the line 21 in response to negative signals at its input, that is no signals provided by the circuit 18 when the speeds NL and NH are below their preset limiting values. The signal on line 23 is supplied to a known type of switching device 83 which can connect a line 84 to a $-15$ V rail. Line 84 is connected to a junction 82, to modify the signals on line 19 to the input of the amplifier 80, so that in the absence of a signal on line 23 the input to the amplifier 80 is held negative. As described above the signal on line 23 is, in normal operation, ultimately derived from the comparator 29 in arrangement 17, and its presence is dependent on the level of the datum voltage Vd2. If, as a result of tolerances in the several components of the system, a signal on line 19 precedes an output signal from the circuit 31, the integrating amplifier 80 may provide a substantial step change at its output, since the signal on line 19 may have reached a considerable level before the negative voltage on line 84 is removed by a signal on line 23. To avoid this, the voltage Vd2 is adjusted so that the signal on line 23 always removes the signal on line 84 while the signal on line 19 is below zero.

The effect of setting the datum voltage Vd2 is illustrated in FIG. 4 which shows two signals A19 and B19 on the line 19 and two signals A31 and B31 from the circuit 31, the signal A31 leading the signal A19 and the signal B19 leading the signal B31. In the case of signals A19, A31, the enable signal on line 23 will occur at time t1 when the signal A31 exceeds the datum voltage Vd2. In the case of signals B19, B31 the enable signal on line 23 will occur at time t2. In both cases it will be seen that the signal on line 23 will remove the negative voltage on line 84 while the signal on line 19 is still negative. The value of Vd2 will always be adjustably selected to ensure that this will happen in every case.

In use both of the arrangements 16, 17 will be operating. Assuming that control by arrangement 16 has initially been selected, limit signals on the line 19 are applied to the control circuit 20. The circuit 20 supplies signals on line 21 only in the presence of an enabling signal on line 23 and, as described above, the signal on line 23 is present only when a limit signal from the circuit 31 exceeds the datum value Vd2. Thus, actuating signals on line 21 are supplied only when the limit signal generating circuit 31 in arrangement 17 is providing signals which correspond substantially to those on line 19. If the computer arrangement 14 detects a persistent unacceptable level of the power supply P1, a signal is provided on line 42 and the actuator 37 operates the switch 35 to render the limiting device 13 responsive to signals from the arrangement 17. The computer arrangement 15 also responds to the fault in power supply P1 to provide a signal on the line 32 to the OR gate 28, which enables the control circuit 33 so long as the fault on power supply P1 persists. A subsequent malfunction on power supply P2 provides a signal on line 43, and the combination of these signals causes the actuators 37, 38 to move the switches 35, 36 to positions in which both power supplies are isolated from the limiting device 13. The limiting device 13 is thereafter ineffective to restrict fuel flow. With the system operating so that the limiting device 13 is under control of the arrangement 16, a programming or hardware fault in the computer arrangement 14, detected as indicated above, causes a signal to be provided on the line 42 and the switch 36 to be operated to place the device 13 under control of the arrangement 17. If a low-speed test described above indicates that the circuit 31 is defective, the computer 14 provides a signal on the line 30 so that the control circuit 20 is permanently enabled.

It will be understood that a generally similar sequence of events occurs, but with the roles of the arrangements 16, 17 reversed, if control of the device 13 by the arrangement 17 is initially selected.

What is claimed is:

1. A system for generating electrical signals for operating a limit device on an apparatus, said system comprising first and second circuits responsive to an operating condition of said apparatus for simultaneously generating nominally identical first and second output signals respectively when said operating condition exceeds a predetermined value, first and second control devices for providing first and second actuating signals to said limit device, said first and second control devices being responsive to said first and second output signals respectively, and first and second means for enabling said second and first control devices respectively to provide said actuating signals, said first and second means being responsive to said first and second output signals respectively.

2. A system as claimed in claim 1 which includes switch means for selectively rendering said limiting device responsive to said first or second actuating signals.

3. A system as claimed in claim 2 which includes a first power supply for said first circuit and said first control device, a second power supply for said second circuit and said second control device, means, responsive to unacceptable magnitudes of said first and second power supplies, for generating respective first and second indicating signals, and means responsive to said first and second indicating signals for operating said switch means to render said limit device responsive to said second and first actuating signals respectively.

4. A system as claimed in claim 3 which includes means, responsive to unacceptable magnitudes of said first and second power supplies, for generating respective third and fourth indicating signals, said first and second enabling means being additionally respectively responsive to said third and fourth indicating signals.

5. A system as claimed in claim 4 which includes means for supplying first and second datum voltages, means responsive to the levels of said first datum voltage and said first output signal for generating a fifth indicating signal, and to the levels of said second datum voltage and said second output signal for generating a sixth indicating signal, said first and second enabling means being responsive to said fifth and sixth indicating signals respectively.

6. A system as claimed in claim 5 in which said first and second control devices each include an integrating circuit and means for preventing said integrating circuit from generating a negative output in response to a negative input.

7. A system as claimed in claim 6 which includes means for applying to the inputs of each said integrating circuits a negative voltage for preventing said integrating circuits from generating an output, means responsive to said fourth or said sixth indicating signals for preventing application of said negative voltage to said first control device, and means responsive to said third or said fifth indicating signals for preventing application of said negative voltage to said second control device.

8. A system as claimed in claim 4 in which said means for generating said first and fourth indicating signals comprises a first digital computer, and said means for generating said second and third indicating signals comprises a second digital computer.

9. A system as claimed in claim 8 in which each of said digital computers includes means for performing checks on its hardware and programming, and for generating said first and second indicating signals in response to hardware or programming faults.

10. A system as claimed in claim 1 in which each of said first and second circuits comprises an error amplifier responsive to said operating condition and to a reference voltage for generating said output signals.

11. A system as claimed in claim 10 which includes means for sstting said reference voltage to a reduced value.

12. A system for generating electrical signals for operating a limit device on an apparatus, said system comprising first and second circuits responsive to an operating condition of said apparatus for simultaneously generating nominally identical first and second output signals respectively when said operating condition exceeds a predetermined value, first and second control devices for providing first and second actuating signals to said limit device, said first and second control devices being responsive to said first and second output signals respectively, first and second means for enabling said second and first devices respectively to provide said actuating signals, said means for enabling said second and first control devices being responsive to said first and second output signals respectively, switch means for selectively rendering said limiting signals responsive to said first or second actuating signals, a first power supply for said first circuit and said first control device, a second power supply for said second circuit and second control device, means responsive to unacceptable magnitudes of said first and second power supplies for generating respective first and second indicating signals, means responsive to said first and second indicating signals for operating each said switch means to render said limit device responsive to said second and first actuating signals respectively, each of said first and second circuits including means responsive to said operating condition and to a presettable signal level, whereby when said level-reducing means is operative said first and second circuits can provide said first and second output signals even when said predetermined values of said operating condition are not exceeded.

13. A system as claimed in claim 12 which includes means for inhibiting operation of said level-reducing means when said operating condition reaches a value intermediate said predetermined value and said reduced value.

14. A system as claimed in claim 12 in which said first and second control devices respectively include means for generating first and second current indicating signals corresponding to the levels of said first and second actuating signals respectively, and first and second computing devices, said second and first computing devices being responsive to unacceptable levels of said first and second current indicating signals respectively to provide respective third and fourth indicating signals, said first and second enabling means being additionally responsive to said third and fourth indicating signals respectively.

15. A system for generating electrical signals for operating a limit device on an apparatus, said system including first and second circuits each comprising an error amplifier responsive to an operating condition of said apparatus and to reference voltage for simultaneously generating substantially identical first and second output signals respectively, when said operating condition exceeds a predetermined value, means for setting said reference voltage to a reduced value, means for inhibiting the setting of said reduced value when said operating condition exceeds a predetermined value, first and second control devices for providing first and second actuating signals to the limit device, said first and second control devices being responsive to said first and second output signals respectively, and first and second means responsive to said first and second output signals respectively for enabling said second and first control devices respectively to provide said actuating signals.

* * * * *